(12) United States Patent
Asou et al.

(10) Patent No.: US 7,135,050 B2
(45) Date of Patent: Nov. 14, 2006

(54) HYDROGEN GENERATOR

(75) Inventors: Tomonori Asou, Nara (JP); Akira Maenishi, Toyonaka (JP); Takeshi Tomizawa, Ikoma (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 593 days.

(21) Appl. No.: 10/110,541

(22) PCT Filed: Aug. 10, 2001

(86) PCT No.: PCT/JP01/06953

§ 371 (c)(1),
(2), (4) Date: Apr. 15, 2002

(87) PCT Pub. No.: WO02/16258

PCT Pub. Date: Feb. 28, 2002

(65) Prior Publication Data
US 2002/0150800 A1    Oct. 17, 2002

(30) Foreign Application Priority Data
Aug. 25, 2000 (JP) .............................. 2000-255249
Nov. 21, 2000 (JP) .............................. 2000-353793

(51) Int. Cl.
B01J 7/00 (2006.01)
B01J 8/00 (2006.01)
H01M 8/06 (2006.01)

(52) U.S. Cl. .............................. 48/127.9; 48/61; 48/76; 422/105; 422/107; 422/108; 422/110; 422/111

(58) Field of Classification Search ............ 422/21–25, 422/105–108, 110, 111; 429/13–19; 48/61, 48/73, 76–78, 127.9; 73/199, 597
See application file for complete search history.

(56) References Cited

U.S. PATENT DOCUMENTS

| 5,006,425 A | * | 4/1991 | Takabayashi ................. 429/23 |
| 5,677,073 A | * | 10/1997 | Kawatsu ....................... 429/22 |
| 6,165,633 A | | 12/2000 | Negishi |
| 6,308,572 B1 | * | 10/2001 | Ishikawa et al. ............... 73/597 |
| 2002/0031450 A1 | | 3/2002 | Yamashita et al. |
| 2002/0071974 A1 | | 6/2002 | Yamaoka et al. |

FOREIGN PATENT DOCUMENTS

| EP | 0 798 798 A2 | 10/1997 |
| EP | 0 973 220 A2 | 1/2000 |

(Continued)

*Primary Examiner*—Alexa D. Neckel
(74) *Attorney, Agent, or Firm*—McDermott Will & Emery LLP

(57) ABSTRACT

In a hydrogen generator comprising a reforming unit having a material supply unit and a water supply unit, and a burner for heating the reforming unit, having a fuel supply unit and an air supply unit, a control unit is arranged for controlling the amount of air to be supplied from the air supply unit to the burner, based on the temperature of the reforming unit and the amount of a raw material supplied to the reforming unit, in order to make the combustion state of the burner stable so as to improves the operation and convenience thereof.

9 Claims, 9 Drawing Sheets

FOREIGN PATENT DOCUMENTS

| | | |
|---|---|---|
| EP | 1 014 464 A2 | 6/2000 |
| JP | 62-82660 A | 4/1987 |
| JP | 01-283773 | 11/1989 |
| JP | 4-167369 A | 6/1992 |
| JP | 04-321502 | 11/1992 |
| JP | 5-47399 A | 2/1993 |
| JP | 5-157229 | 6/1993 |
| JP | 06-176787 | 6/1994 |
| JP | 6-231792 | 8/1994 |
| JP | 7-172802 A | 7/1995 |
| JP | 2001-23659 A | 1/2001 |
| JP | 2001-35517 A | 2/2001 |
| JP | 2001-302207 A | 10/2001 |

* cited by examiner

F I G. 8
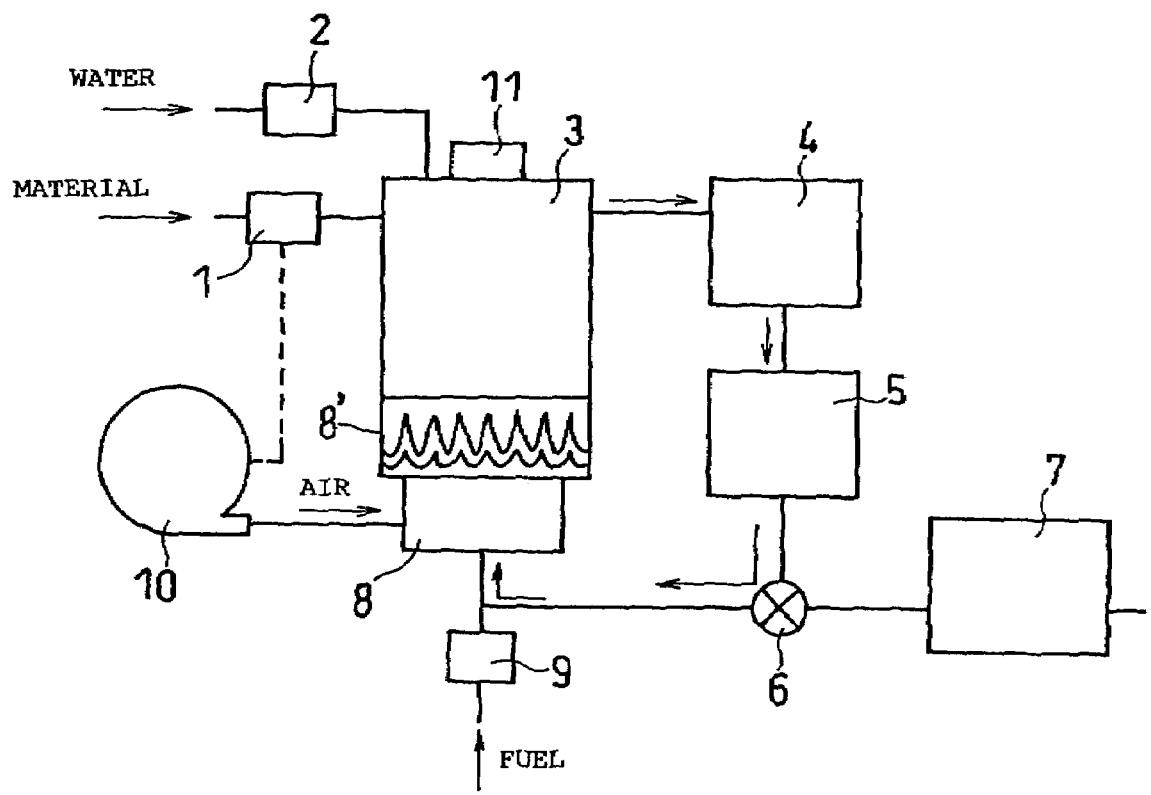
PRIOR ART

HYDROGEN GENERATOR

TECHNICAL FIELD

The present invention relates to a hydrogen generator, which generates a hydrogen-rich gas to be supplied to appliances using hydrogen such as fuel cells, by using a hydrocarbon type material such as natural gas, liquefied petroleum gas, gasoline, naphtha or kerosene as a main raw material.

BACKGROUND ART

A method for activating a conventional hydrogen generator used for supplying hydrogen to a fuel cell will be described, referring to FIG. 8. FIG. 8 is a schematic view showing a configuration of the conventional hydrogen generator.

The hydrogen generator shown in FIG. 8 comprises a material supply unit 1 and a water supply unit 2, each being connected to a reforming unit 3 filled with a reforming catalyst. A raw material supplied from the material supply unit 1 is reformed in the reforming unit 3; the resultant reformed gas flows into a shifting unit 4 filled with a shifting catalyst to be shifted; and the resultant shifted gas flows out of the shifting unit 4 and into a purifying unit 5 filled with a CO removing (purifying) catalyst to be purified The resultant purified gas flows out of the purifying unit 5 and, as a generated gas, passes along through a three-way valve 6 to be supplied to a fuel cell 7, or, in some cases, is led to a burner 8 arranged in the vicinity of the reforming unit 3. The hydrogen generator shown in FIG. 8 comprises the reforming unit 3, the shifting unit 4 and the purifying unit 5, but in some cases, the hydrogen generator may comprise only the reforming unit, or may comprise only the reforming unit 3 and the shifting unit 4. The burner 8 comprises a combustion chamber 8', and a fuel supply unit 9 and an air supply unit 10 for supplying air for combustion are further arranged. A combustion gas that generates in the burner 8 is discharged from out of an outlet 11 arranged on the reforming unit 3.

At the time of start-up of the hydrogen generator having the configuration as thus described, the generated gas left in the purifying unit 5 and air for combustion from the air supply unit 10 are supplied to the burner 8, and, while an igniting operation is being conducted with an ignition device (not shown), a fuel is supplied from the fuel supply unit 9 to the burner 8, to form a fire. After confirming that the fire is in a stable state, the raw material is supplied from the material supply unit 1 to the reforming unit 3 and passes along through the reforming unit 3, the shifting unit 4 and the purifying unit 5 to give a generated gas, which combusts with the fuel supplied from the fuel supply unit 9 in the burner 8, to heat the reforming unit 3.

Subsequently, the amount of the fuel supplied from the fuel supply unit 9 was gradually reduced and the supply was eventually discontinued, making the generated gas, obtained from the raw material supplied from the material supply unit 1, singly form the fire, which increases temperatures of the reforming unit 3, the shifting unit 4 and the purifying unit 5 to become the optimum temperature conditions thereof, so that the hydrogen generator is activated.

At that time, the amount of air supplied from the air supply unit 10 is adjusted corresponding to the amount of the raw material supplied from the material supply unit 1. In this case, however, because the amount of air corresponds only with the amount of the raw material and thus does not sufficiently correspond with the amount of the combustible gas in the generated gas which actually combusts in the burner 8, the air becomes excess or deficient, which may cause deterioration of characteristic of a combustion exhaust gas and an unstable state of combustion.

The composition of the generated gas and the flow rate of each constituent thereof are determined by the states of the reactions of the catalysts contained in the reaction units such as the reforming unit 3, the shifting unit 4 and the purifying unit 5, which are, for example, the temperatures of the catalysts. In a case where methane is used as the raw material gas, for example, reforming reactions in the reforming unit are primarily represented by the formula (1) and the formula (2) below:

$$CH_4 + 2H_2O \rightarrow 4H_2 + CO_2 \qquad (1)$$

$$CH_4 + H_2O \rightarrow 3H_2 + CO \qquad (2)$$

When a temperature of the reforming catalyst is too low to induce the reforming reaction, the generated gas supplied from the hydrogen generator to the burner 8 is methane which was supplied as the raw material. If the temperature of the reforming catalyst rises to the extent that the reforming reaction sufficiently occurs, however, the reformed gas sent out of the reforming unit 3 are mainly hydrogen and carbon dioxide or carbon monoxide, according to the formula (1) and the formula (2) above, and the total flow rate of the reformed gas is four to five times as high as the flow rate of the supplied methane. Until the temperature of the reforming catalyst rises sufficiently, the composition of the generated gas and the flow rate of each constituent thereof have intermediate values, and with occurrence of subsequent reactions in the shifting unit 4 and the purifying unit 5, the composition of the generated gas and the flow rate of each constituent thereof further change depending on the temperatures of these reaction units.

As thus described, changes in the composition of the generated gas and the like depending on the temperature of each reaction unit brings a change in the amount of the combustible gas in the generated gas. This has raised a problem that adjustment of the amount of air by corresponding to the amount of the supplied raw material causes excess or deficiency of air, making it difficult to consistently maintain a favorable state of combustion in the burner 8. Particularly in a case where the temperature of the reforming catalyst is around 400° C., a reaction rate goes up by several tens of percent per a temperature rise of 10° C., leading to a sudden increase in the flow rate of the gas sent out of the reforming unit 3, which pushes a large amount of the combustible gas present in the shifting unit 4 and the purifying unit 5 into the burner 8. Determination of the amount of air by corresponding to the amount of the supplied raw material may, therefore, cause a shortage of air to a considerable degree, making the fire in the burner 8 prone to be unstable and possibly leading to extinguishment.

It is an object of the present invention, then, to solve the above problems and provide a hydrogen generator, where a generated gas therefrom stably combusts in a burner and which is thereby excellent in operation and high in convenience.

Next, a conventional fuel cell system using the above-mentioned hydrogen generator and a fuel cell will be described: FIG. 9 is a schematic view showing a configuration of the conventional fuel cell system. In a fuel cell 101 in the fuel cell system shown in FIG. 9, an air electrode 102 and a fuel electrode 103 are arranged with a polymer electrolyte membrane 104 interposed therebetween, and the upstream side of the air electrode 102 is connected to a blower (an air supply unit) 105 for supplying air.

A hydrogen generator 106 is provided with a raw material X such as natural gas or methanol and water Y required for a steam reforming reaction, and generates a hydrogen-rich generated gas (a reformed gas) G. It is to be noted that the hydrogen generator 106 in FIG. 9 comprises only a reforming unit.

The generated gas G is supplied to the fuel electrode 103 in the fuel cell 101 via a switching valve 107 and flows through a predetermined flow path, which is in contact with the fuel electrode 103, toward the downstream side. At that time, just the required amount of hydrogen in the generated gas G is consumed due to an electrode reaction and the remaining, unreacted gas in the fuel cell 101 flows through a gas flow path 123' to be supplied to the burner 109 as an off-gas G'. When the generated gas G is not supplied to the fuel electrode 103, the gas passes through the switching valve 107 and flows through a gas flow path 123 to be supplied to the burner 109.

The generated gas G or the off-gas G', supplied to the burner 109, combusts after being mixed with air supplied from a fan (an air supply unit) 110, and forms a fire 111 in a combustion chamber 108, to heat the hydrogen generator 106 with a combustion gas.

A state of the fire 111 in the combustion chamber 108 is detected by an ion-current which flows when a predetermined voltage is applied to the fire 111. A fire detecting unit 112 is constituted of a heat-resistant conductor 113 arranged such that it comes in contact with the fire 111, a direct current power source 114 for applying a predetermined voltage to the conductor 113 and to the burner 109 via the fire 111, an electric resistance 115 for converting a current flowing in the fire 111 into a voltage and a voltage detecting unit 116 for detecting a voltage across the electric resistance 115. This fire detecting unit 112 can detect a combustion state of the fire 111 such as ignition or extinguishment.

In such a conventional fuel cell system, concentrations of hydrocarbon in the generated gas G and the off-gas G' are significantly low since hydrocarbon in the raw material X has been converted into hydrogen due to a steam reforming reaction. The low concentration of hydrocarbon lowers a concentration of ions in the fire 111, which also decreases the value of the current flowing in the fire 111 and thereby lowers the voltage across the electric resistance 115. That is to say, a voltage to be detected by the fire detecting unit 112 is lowered, raising the problem of difficulty in determining the combustion state at the time of ignition and fire extinguishment.

It is an object of the present invention, accordingly, to solve the above problem and provide a hydrogen generator which ensures determination of ignition and fire extinguishment of a burner for heating the hydrogen generator and can be safely operated, and a fuel cell system comprising the above-mentioned hydrogen generator.

DISCLOSURE OF INVENTION

The present invention relates to a hydrogen generator comprising: a reforming unit having a material supply unit and a water supply unit; and a burner for heating the reforming unit, having a fuel supply unit and an air supply unit, characterized by further comprising a gas flow path for leading a generated gas from the hydrogen generator to the burner, a reforming temperature detecting unit for measuring a temperature of the reforming unit, and a control unit for controlling the amount of air to be supplied from the air supply unit to the burner based on a signal from the material supply unit and a signal from the reforming temperature detecting unit.

In this hydrogen generator, it is effective that the control unit increases the amount of a raw material to be supplied from the material supply unit at the time of start-up of the hydrogen generator in a predetermined ratio, leads the generated gas from the hydrogen generator to the burner, and controls the amount of air to be supplied from the air supply unit to the burner based on the signal from the material supply unit and the signal from the reforming temperature detecting unit.

It is also effective that the hydrogen generator comprises a shifting unit provided downstream from the reforming unit and a shifting temperature detecting unit for measuring a temperature of the shifting unit, and the control unit controls the amount of air to be supplied from the air supply unit to the burner based on the signal from the material supply unit, the signal from the reforming temperature detecting unit and a signal from the shifting temperature detecting unit.

It is also effective that the hydrogen generator comprises a purifying unit provided downstream from the shifting unit and a purifying temperature detecting unit for measuring a temperature of the purifying unit, characterized in that the control unit controls the amount of air to be supplied from the air supply unit to the burner based on the signal from the material supply unit, the signal from the reforming temperature detecting unit, the signal from the shifting temperature detecting unit and a signal from the purifying unit.

It is also effective that the control unit predicts the amount of a combustible gas to be supplied to the burner, based on the amount of a combustible gas in the reformed gas and the amount of a fuel to be supplied from the fuel supply unit to the burner, and controls the amount of air to be supplied from the air supply unit to the burner.

It is also effective that the burner comprises a combustion chamber for forming a fire and a fire detecting unit for detecting a state of the fire based on an ion-current of the fire, and the control unit controls a temperature of the reforming unit to be a predetermined temperature or lower.

It is also effective that the control unit controls the temperature of the reforming unit by adjusting the amount of water to be supplied from the water supply unit to the reforming unit.

It is also effective that the hydrogen generator comprises a hydrocarbon sensor for detecting a concentration of hydrocarbon in the generated gas and the control unit controls the temperature of the reforming unit based on an output value of the hydrocarbon sensor.

Furthermore, the present invention relates to a fuel cell system comprising a fuel cell and the above-mentioned hydrogen generator.

BRIEF DESCRIPTION OF DRAWINGS

FIG. 8 is a schematic view showing a configuration of a conventional hydrogen generator.

BEST MODE FOR CARRYING OUT THE INVENTION

Embodiments of a hydrogen generator and a fuel cell system comprising this hydrogen generator, in accordance with the present invention, will be described in the following, with reference to the drawings:

Embodiment 1

Figure 1:
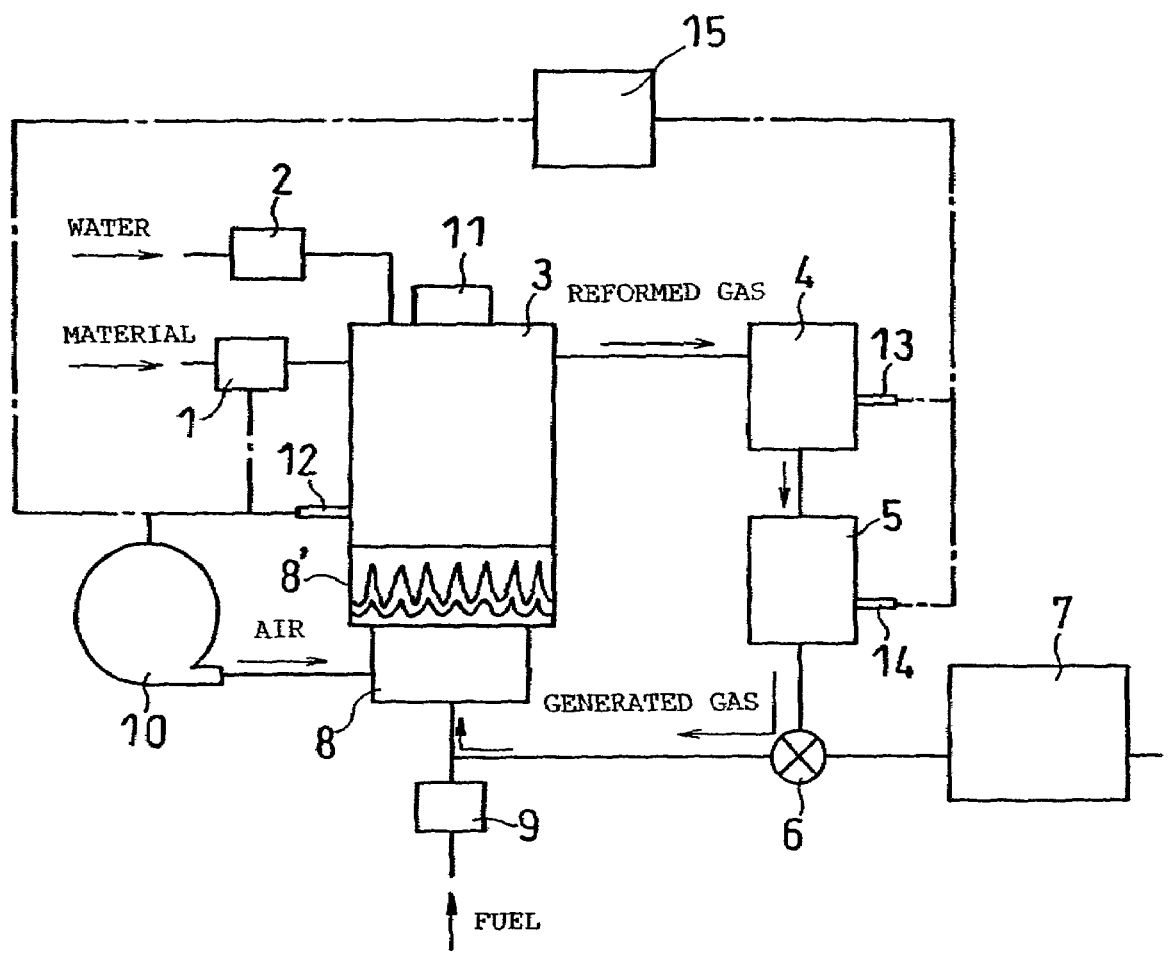
FIG. 1 is a schematic view showing a configuration of a hydrogen generator in accordance with the present invention.

FIG. 1 is a schematic view showing a configuration of a hydrogen generator in accordance with Embodiment 1 of the present invention. In the hydrogen generator shown in FIG. 1, a material supply unit 1 and a water supply unit 2 are connected to a reforming unit 3 filled with a reforming catalyst. A raw material supplied from the material supply unit 1 is reformed in the reforming unit 3; the reformed gas flows into a shifting unit 4 filled with a shifting catalyst to be shifted; and the shifted gas flows into a purifying unit 5 filled with a CO removing (purifying) catalyst to be purified. The purified gas, as a generated gas, flows through a gas flow path and is led by a three-way valve 6 to either a fuel cell 7 or a burner 8 arranged in the vicinity of the reforming unit 3. The burner 8 is provided with a fuel supply unit 9 and an air supply unit 10 for supplying air for combustion. A combustion exhaust gas in the burner 8 is discharged from out of an outlet 11 arranged on the reforming unit 3.

The raw material supplied from the material supply unit 1 and the fuel supplied from the fuel supply unit 9 may be exemplified by gaseous hydrocarbon fuels such as natural gas, city gas and liquefied petroleum gas, and liquid hydrocarbon fuels such as gasoline, kerosene and methanol. Although the use of the liquid fuel normally necessitates a device for vaporizing the fuel, vaporization of the fuel is possible when a conductive heat from the reforming unit 3 or from the burner 8, a sensible heat in the combustion exhaust gas or the like is utilized.

The flow rate of the raw material from the material supply unit 1, the flow rate of the fuel from the fuel supply unit 9 and the amount of air from the air supply unit 10 may be adjusted with a pump, a fan or the like, or with a flow adjuster such as a valve individually arranged downstream from the pump, the fan or the like. The material supply unit 1, the fuel supply unit 9 and the air supply unit 10 in accordance with the present description all comprise such a flow adjuster.

Moreover, the arrows in FIG. 1 show the directions of flows of the raw material, the reaction gas, the fuel and the like, respectively. Furthermore, a reforming temperature detecting unit 12 for measuring a temperature of the reforming catalyst is arranged on the reforming unit 3, and based on a temperature (signal) detected by the reforming temperature detecting unit 12 and the amount of the raw material (signal) supplied from the material supply unit 1, a control unit 15 can control the amount of air to be supplied from the air supply unit 10 to the reforming unit 3. For the exemplary reforming temperature detecting unit 12, a thermocouple, a high-temperature thermistor or the like may be used.

Next, a method for activating the hydrogen generator shown in FIG. 1 will be described.

At the time of start-up of the hydrogen generator, the three-way valve 6 is controlled so that a generated (purified) gas sent out of the purifying unit 5 can be supplied to the burner 8. The air is then supplied from the air supply unit 10 to the burner 8 and, while an ignition operation is being conducted with the ignition device (not shown in FIG. 1), the fuel is supplied from the fuel supply unit 9 to the burner 8, to form the fire 8. These operations can be conducted simultaneously.

After confirming that the fire in the burner 8 is in a stable state, the raw material is supplied from the material supply unit 1 to the reforming unit 3. The raw material then passes along though the reforming units of the reforming unit 3, the shifting unit 4 and the purifying unit 5 to give a generated gas, which, in the burner 8, combusts with the fuel supplied from the fuel supply unit 9, to heat the reforming unit 3.

The amount of the fuel to be supplied from the fuel supply unit 9 to the burner 8 is then gradually reduced, followed by eventual discontinuation of the supply, and with the generated gas supplied to the burner 8 as a result of supplying the raw material from the material supply unit 1 to the reforming unit 3, the fire is formed in the burner 8. This raises the temperature of each reaction unit, to be kept within an optimal temperature range, and the start-up of the hydrogen generator is completed.

Next, the reaction in each reaction unit will be described:

(1) Reforming Unit

In the reforming unit 3, from mainly the two reactions represented by the formula (1) and the formula (2) above, a total of 5 mol of hydrogen and carbon dioxide or a total of 4 mol of hydrogen and carbon monoxide are generated from 1 mol of methane.

Figure 2:
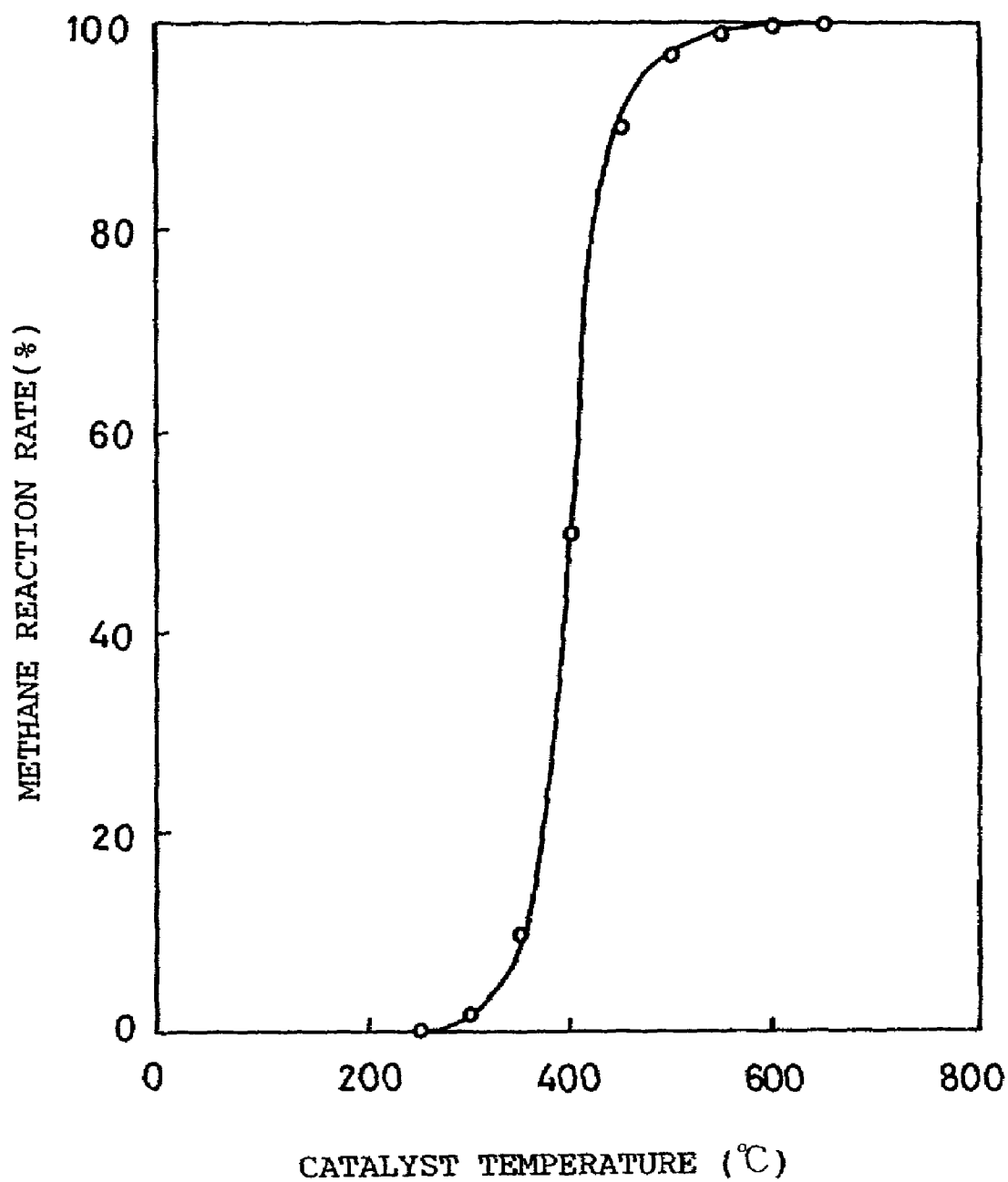
FIG. 2 is a graph showing a reforming reaction rate of methane by a reforming catalyst.

FIG. 2 is a graph showing a reaction rate of methane versus a temperature of the reforming catalyst, that is, a graph showing a relation between the catalyst temperature and the reaction rate of methane. This indicates that there is a sudden increase in the reaction rate of methane around 400° C., indicating a sudden promotion of the reforming reaction. It is found, accordingly, that the composition of the reformed gas sent out of the reforming unit 3 and the flow rate of each constituent thereof greatly change depending on the temperature of the reforming catalyst. The generated gas sent out of the hydrogen generator is a purified gas which is present in the vicinity of the outlet of the purifying unit 5, closest to the burner 8, and which has been pushed out by the reformed gas. When the temperature of the reforming catalyst is about 600° C. at the time of the start-up, there are not much increases in the temperatures of the shifting unit 4 and the purifying unit 5, which thereby do not sufficiently promote the shifting reaction and the selective oxidation (purifying) reaction, causing the reformed gas to occur almost no reactions in the passage thereof through the shifting unit 4 and the purifying unit 5.

Therefore, by predicting the composition of the reformed gas and the flow rate of each constituent thereof based on the amount of the raw material supplied to the reforming unit 3 and the temperature of the reforming catalyst and grasping rates of changes in the composition and the flow rate thus predicted, versus time, the composition of the purified gas (generated gas) in the vicinity of the purifying unit 5 which was pushed out by the reformed gas and the flow rate of each constituent of the composition can be predicted so as to know the flow rate of a combustible gas in the generated gas.

For example, when methane is supplied at 1 NL/min as the raw material to the reforming unit 3 with the reforming catalyst at a temperature of 400° C., a reaction rate of methane becomes 50% according to FIG. 2, and the reactions of the formula (1) and the formula (2) occur in a ratio of about 10:1, although the rate at which reactions of the formula (1) and the formula (2) occur versus the temperature of the catalyst is not shown in the graph. It is considered, therefore, that, in this case, the reformed gas having a temperature of 400° C. contains 0.5 NL/min of unreacted methane, 1.95 NL/min of hydrogen according to the formula (1) and the formula (2), 0.45 NL/min of carbon dioxide according to the formula (1), and 0.05 NL/min of carbon monoxide according to the formula (2). In the same manner, the flow rate of the reformed gas corresponding to the temperature of the reforming catalyst and the flow rate of each constituent can be calculated to know changes in these flow rates versus time.

Based on the volume of the gas flow path between the outlet of the reforming unit 3 and the burner 8, obtained is the time at which the reformed gas, generated with the reforming catalyst of 400° C., passes along through the shifting unit 4 and the purifying unit 5, as being pushed out by the subsequently generated reformed gas, and then arrives at the burner 8. Using the time thus obtained, the flow rate of the combustible gas in the reformed gas upon arrival of the reformed gas at the burner 8 as the generated gas is known (0.5 NL/min of methane, 1.95 NL/min of hydrogen, and 0.05 NL/min of carbon monoxide), and thus the theoretical amount of air versus each constituent can be calculated (the theoretical air amount: 4.76 NL/min (versus methane), 4.64 NL/min (versus hydrogen), and 0.12 NL/min (versus carbon monoxide)), permitting supply of optimal amount of air from the air supply unit 10 to the burner 8.

Accordingly, after detections of composition of the reformed gas and the flow rate of each constituent thereof, based on the signal from the material supply unit 1 (the amount of the supplied raw material) and the signal from the reforming temperature detecting unit 12 (the temperature of the reforming catalyst), and subsequent determination of appropriate amount of air to be supplied to the burner 8, air in the amount based on the above determined amount can be supplied from the air supply unit 10 to the burner 8. Even under a condition that there are changes in the composition of the generated gas and the flow rate of each constituent thereof, these composition and flow rate can be predicted based on the amount of the raw material and the temperature of the reforming catalyst, which can thereby realize the stable combustion state of the burner 8 and the satisfactory characteristic of the combustion exhaust gas. The characteristic of the combustion exhaust gas in this text is whether the combustion exhaust gas contains CO or unburned hydrocarbon or not, due to incomplete combustion caused by a shortage or an excess of air, for example. In other words, the satisfactory characteristic of the combustion exhaust gas means that the combustion exhaust gas contains almost no CO and unburned hydrocarbon.

(2) Shifting Unit

Figure 3:
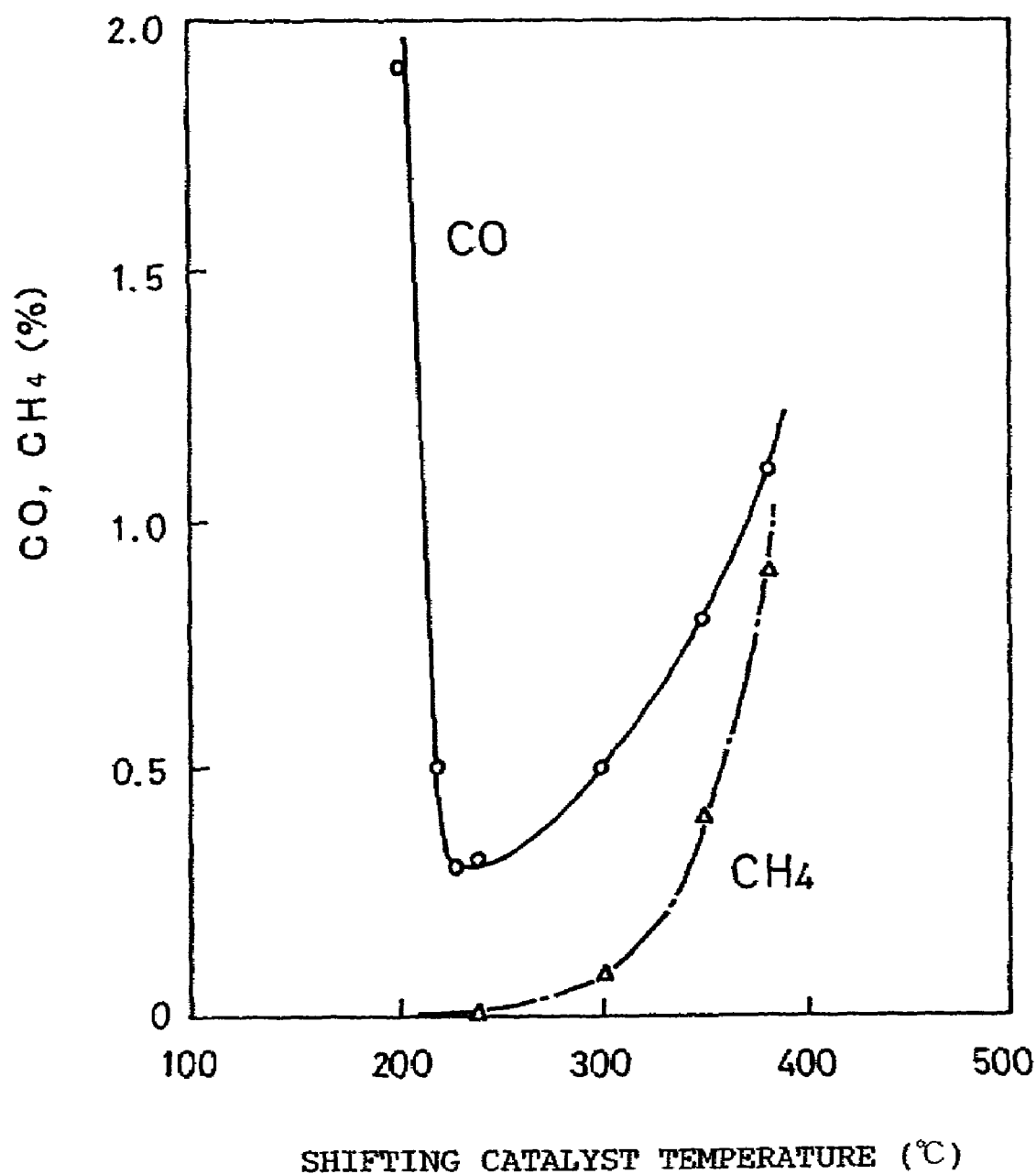
FIG. 3 is a graph showing reactivity of a shifting catalyst.

Next, a standard gas composed of 10% by volume of CO, 10% by volume of $CO_2$ and 80% by volume of $H_2$ is supplied to a platinum-group type shifting catalyst, and the concentration (% by volume) of CO or $CO_2$ versus the temperature of the shifting catalyst after the above shifting reaction is shown in FIG. 3. It is seen that a shift reaction, a reverse-shift reaction and a methanation occur corresponding to the temperature of the catalyst, and the amounts of CO and $CH_4$ are determined.

In order to grasp states of these reactions with the shifting catalyst, the following method is effective: As shown in FIG. 1, by arranging a shifting temperature detecting unit 13 on the shifting unit 4 to measure the temperature of the shifting catalyst and obtaining the composition of the reformed gas and the flow rate of each constituent thereof based on the amount of the raw material to be supplied to the reforming unit 3 and the temperature of the reforming catalyst, as described above, the composition of the shifted gas at the outlet of the shifting unit 4 and the flow rate of each constituent thereof can be predicted based on the temperature of the shifting catalyst. With this shifted gas regarded as the generated gas from the hydrogen generator, the flow rate of the combustible gas in the generated gas can be more accurately predicted than when the reformed gas is regarded as the generated gas.

More accurate determination of appropriate amount of air to be supplied to the burner 8 is therefore possible, based on the signal from the material supply unit 1, the signal from the reforming temperature detecting unit 12 and the signal from the shifting temperature detecting unit 13.

(3) Purifying Unit

Figure 4:
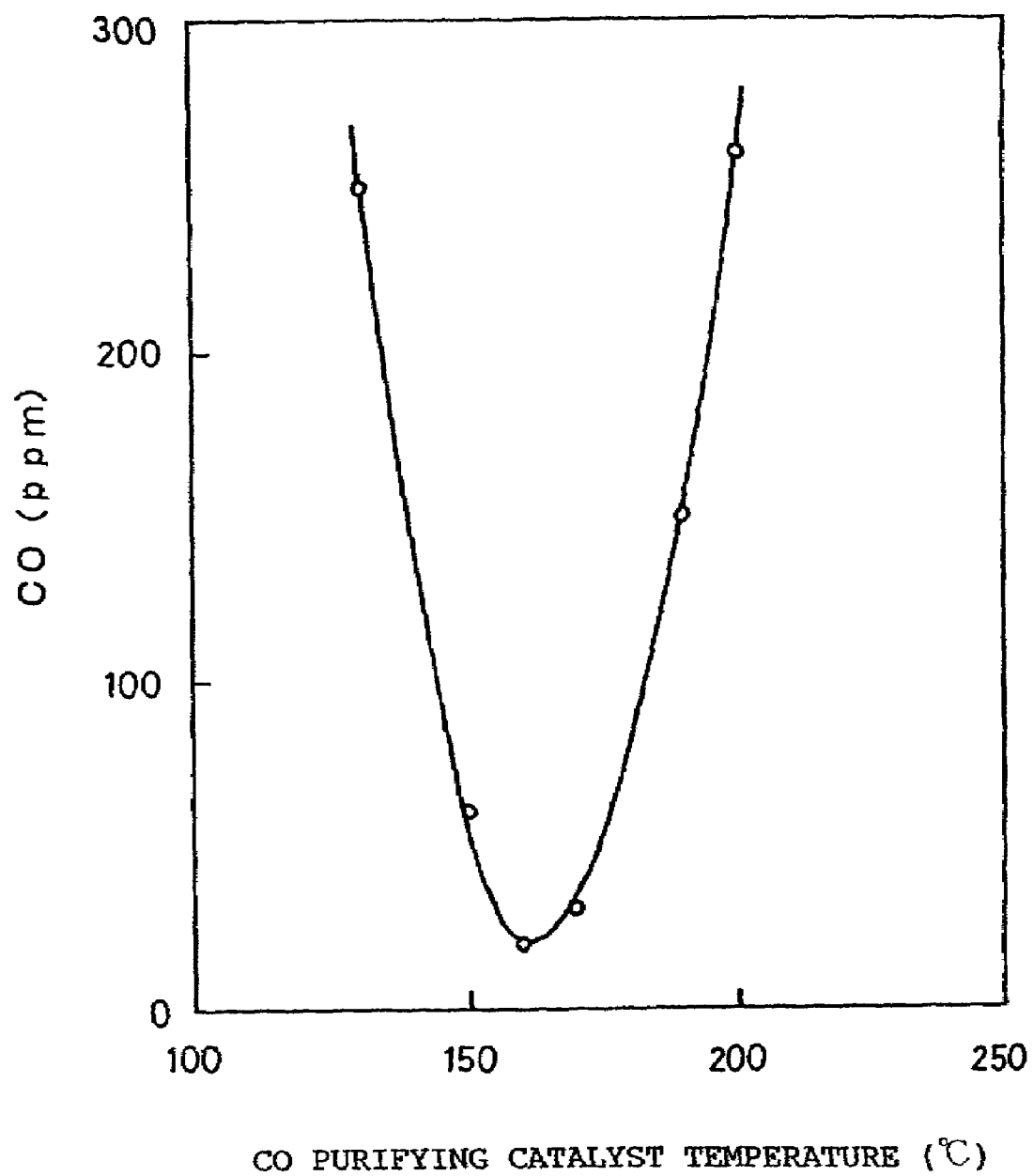
FIG. 4 is a graph showing reactivity of a purifying catalyst.

A standard gas composed of 1% by volume of CO, 19% by volume of $CO_2$ and 80% by volume of $H_2$ is supplied to a platinum-group type CO removing (purifying) catalyst and the concentration of CO (ppm) versus the temperature of the purifying catalyst is shown in FIG. 4. It is seen that an oxidation reaction and a reverse-shift reaction determine the amount of CO, corresponding to the temperature of the catalyst.

In order to grasp states of these reactions with the shifting catalyst, the following method is effective: As shown in FIG. 1, by arranging a purifying temperature detecting unit 14 on the purifying unit 5 to measure the temperature of the purifying catalyst, obtaining the composition of the reformed gas and the flow rate of each constituent thereof based on the amount of the raw material to be supplied to the reforming unit 3 and the temperature of the reforming catalyst, as described above, and further obtaining the composition of the shifted gas and the flow rate of each constituent thereof based on the temperature of the shifting catalyst, the composition of the purified gas obtained in the purifying unit 5 and the flow rate of each constituent thereof can be predicted based on the temperature of the purifying catalyst. With this purified gas regarded as the generated gas from the hydrogen generator, the flow rate of the combustible gas in the generated gas can be more accurately predicted than when the reformed gas or the shifted gas is regarded as the generated gas.

More accurate determination of appropriate amount of air to be supplied to the burner 8 is possible, therefore, based on the signal from the material supply unit 1, the signal from the reforming temperature detecting unit 12 the signal from the purifying temperature detecting unit 13, and the signal from the purifying temperature detecting unit 14.

Embodiment 2

Figure 5:
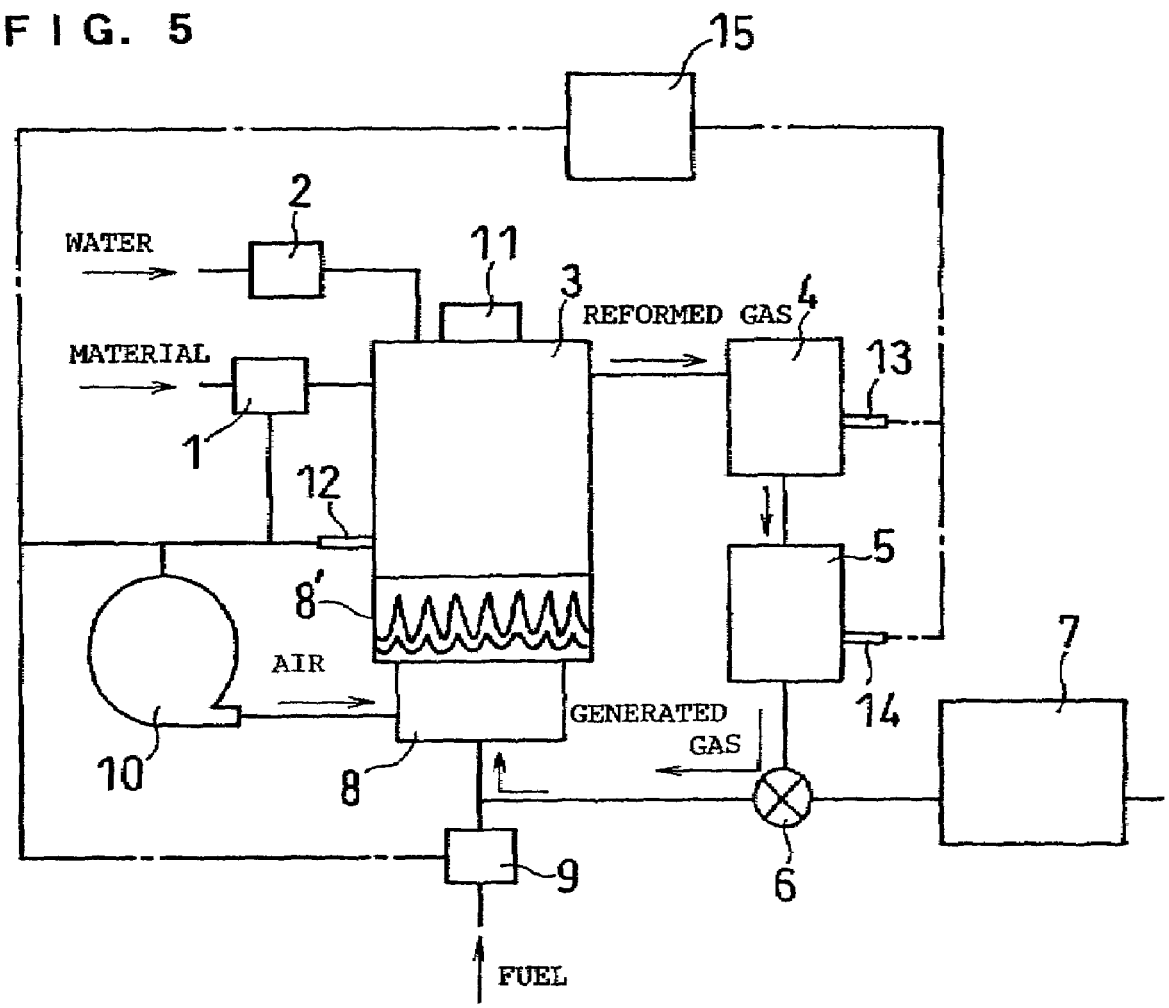
FIG. 5 is a schematic view showing a configuration of another hydrogen generator in accordance with the present invention.

FIG. 5 shows a schematic view showing a configuration of a hydrogen generator in accordance with Embodiment 2 of the present invention. The hydrogen generator shown in FIG. 5 is the same as the hydrogen generator in Embodiment 1, except that a control unit 15 predicts a total flow rate of the combustible gas to be supplied to the burner 8, based on the amount of the fuel supplied to the burner 8 which is detected with the signal from the fuel supply unit 9 and the amount of the combustible gas in the generated gas obtained according to Embodiment 1 above.

With this configuration, supply of the raw material to the reforming unit 3 alone does not sufficiently raise the temperature of the reforming unit 3, and in a case where the combustion amount in the burner 8 is increased by supplying the fuel from the fuel supply unit 9 to the burner 8, a total flow rate of the combustible gas to the burner 8 can be predicted by grasping the flow rate of the fuel based on the signal from the fuel supply unit 9 and predicting a total flow rate of the combustible gas in the generated gas. Subsequently, supply of appropriate amount of air from the air supply unit 10 to the burner 8 corresponding to the total amount of the combustible gas thus predicted can realize the stable combustion state of the burner 8 and the satisfactory characteristic of the combustion exhaust gas.

It should be noted that the detecting unit of each reaction unit may be arranged not only at one point but at a plurality of points on each reaction unit. Arrangement of a plurality of detecting units enables a more detailed grasp of the temperature state of the catalysts and more accurate prediction of the state of the generated gas.

Embodiment 3

Figure 6:
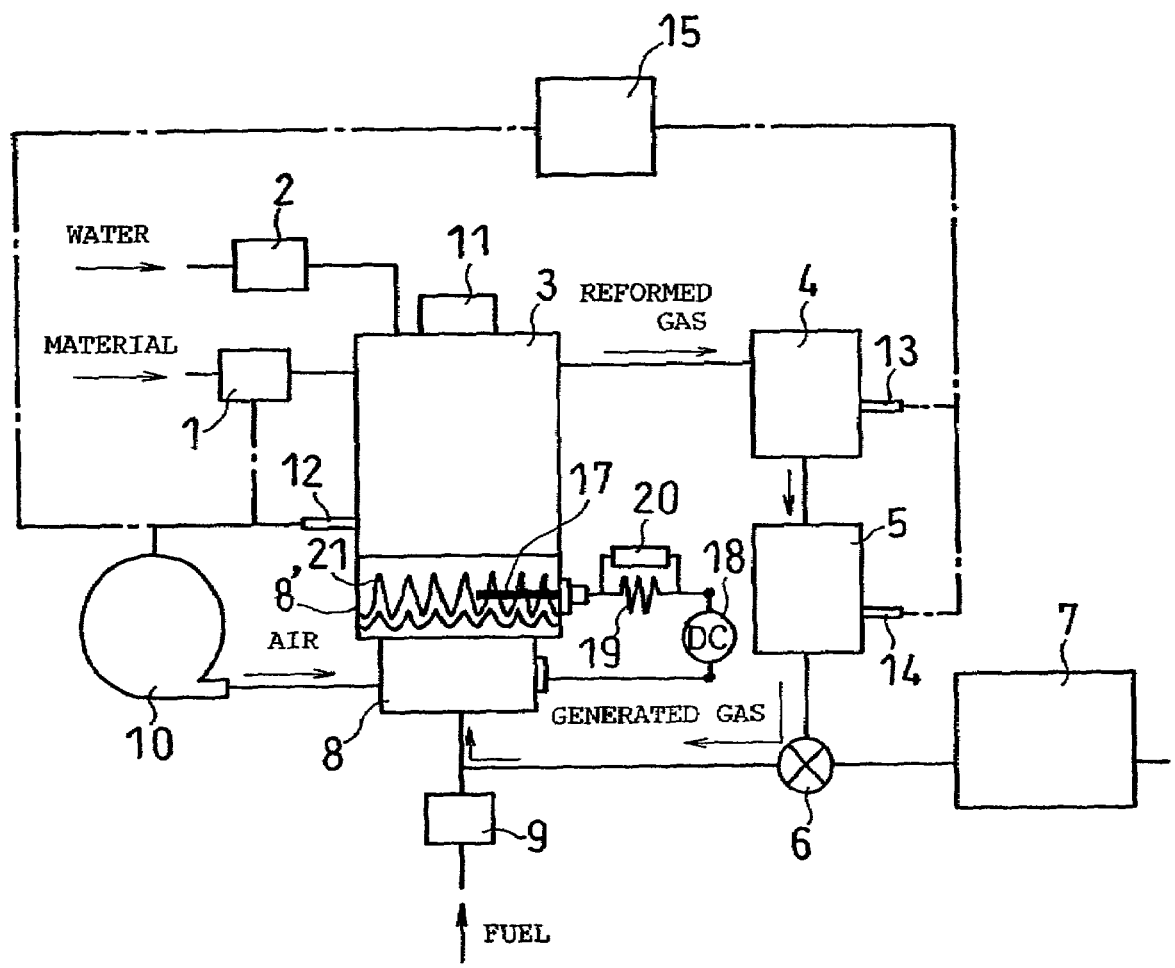
FIG. 6 is a schematic view showing a configuration of still another hydrogen generator.

FIG. 6 is a schematic graph showing a configuration of still another hydrogen generator in accordance with the present invention. In the burner 8 of the hydrogen generator shown in FIG. 6, the combustion chamber 8' where the fire is formed comprises a fire detecting unit for detecting the state of the fire based on the ion-current of the fire. This fire detecting unit is constituted of a heat-resistant conductor 17 arranged such that it comes in contact with the fire 21, a direct current power source 18 for applying a predetermined voltage to the conductor 17 and the burner 8 via the fire 21, an electric resistance 19 for converting the ion-current flowing in the fire 21 into the voltage, and a voltage detecting unit 20 for detecting a voltage across the electric resistance 19. It is to be noted that other elements in FIG. 6 are the same as those in FIG. 1.

The characteristic of the present embodiment is that the control unit 15 controls the temperature of the reforming unit 3 to be a predetermined temperature or lower. Detection of whether the fire in the combustion chamber 8' of the burner 8 is being formed normally or not, that is, detection of the ignition state of the burner 8, requires detection of the ion-current in the fire 21, and the ion-current is not generated in the absence of hydrocarbon such as methane from the gas to be supplied to the burner 8. As the temperatures of the reforming unit 3, the shifting unit 4 and the purifying unit 5 rise and a purity of a hydrogen gas which is the generated gas becomes high, therefore, reliable detection of the ion-current tends to be difficult. In the present embodiment, on the contrary thereto, the control unit 15 controls the temperature of the reforming unit 3 to be the predetermined temperature or lower to get hydrocarbon contained in the generated gas so that the fire detecting unit can detect the ion-current with certainty. This allows reliable detection of the ion-current, leading to a reliable recognition of ignition and fire extinguishment.

Other methods for controlling the temperature of the reforming unit 3 with the control unit 15 include a method of adjusting the amount of water to be supplied from the water supply unit 2 to the reforming unit 3, and a method of arranging a hydrocarbon sensor (not shown) for detecting a concentration of hydrocarbon in the generated gas and using an output value of the hydrocarbon sensor for controlling the temperature of the reforming unit 3.

It should be noted that, although the above description was made regarding to the time of start-up of the hydrogen generator, it can also be applied to the case where, at the time of a normal operation, the amount of hydrogen generated is changed by changing the temperature of the catalyst in each reaction unit.

Embodiment 4

Figure 7:
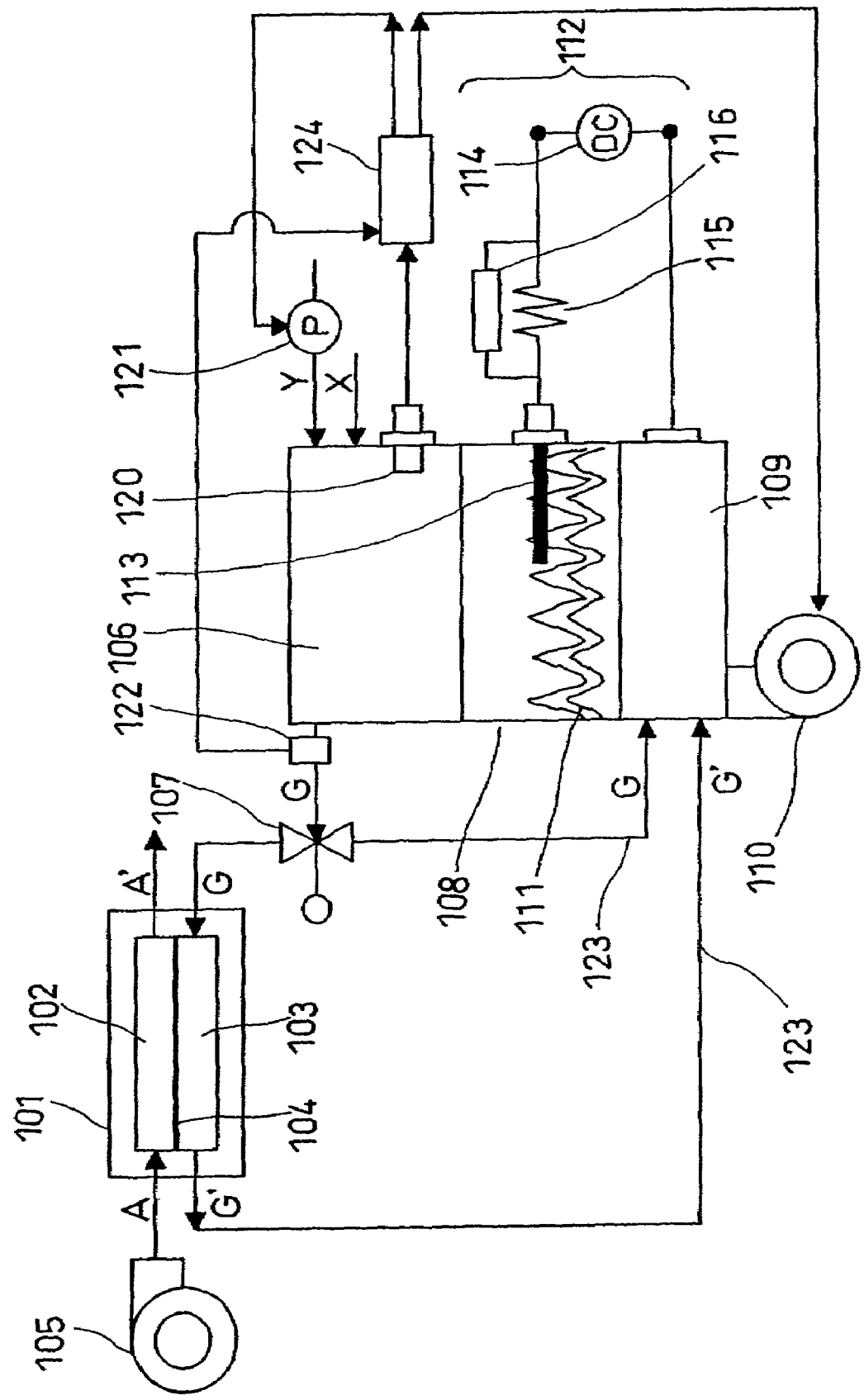
FIG. 7 is a schematic view showing a fuel cell system in accordance with the present invention.
Figure 9:
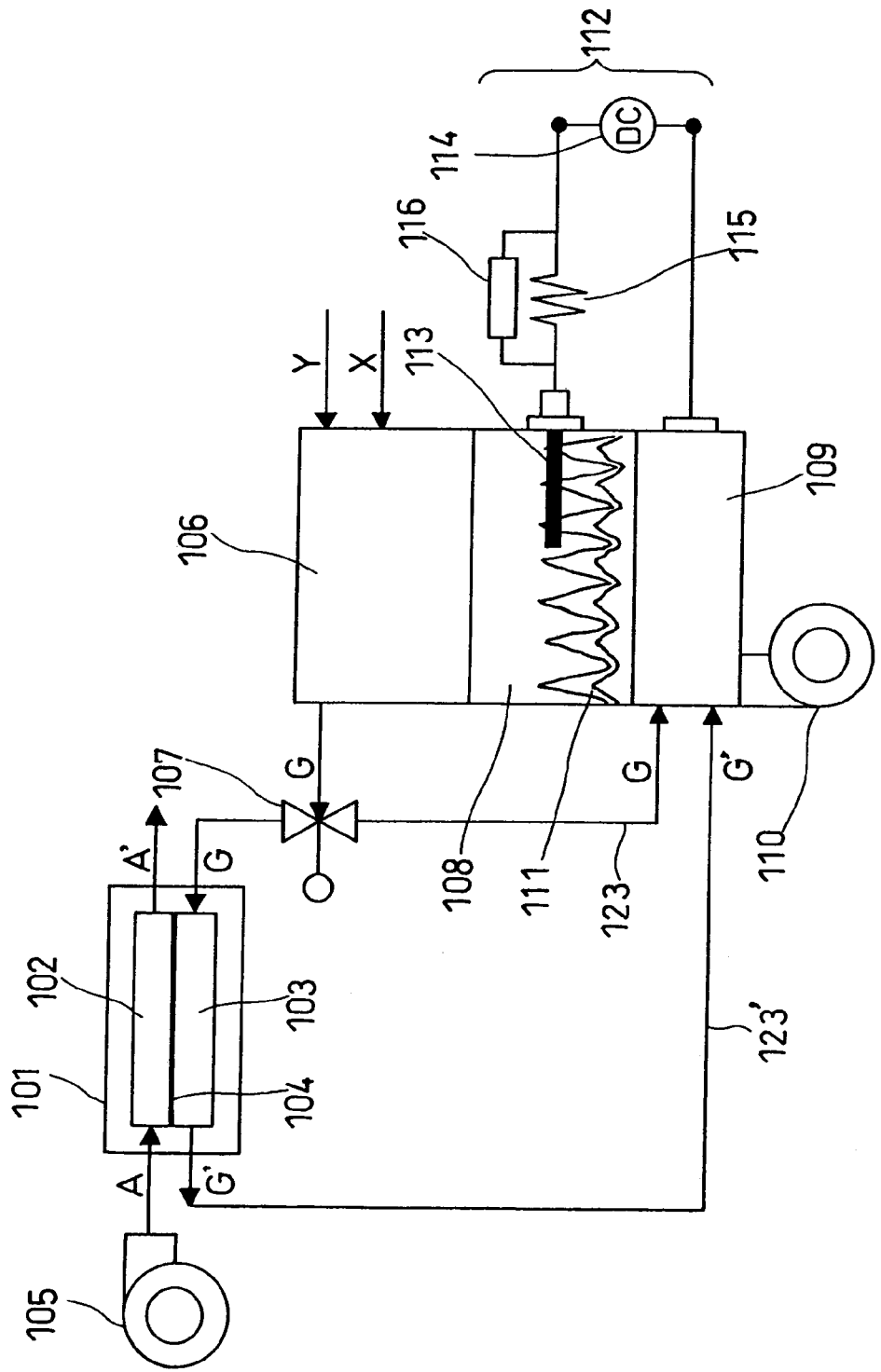
FIG. 9 is a schematic view showing a configuration of a conventional fuel cell system.

The present invention also relates to a fuel cell system (generation device) comprising the above-mentioned hydrogen generator and a fuel cell. FIG. 7 is a schematic view showing a configuration of a fuel cell in accordance with the present embodiment. In FIG. 7, the constituents, having the same functions as the constituents in FIG. 9, which shows the configuration of the fuel cell system using the conventional fuel cell, are indicated with the same marks as those in FIG. 9. The functions of the constituents in FIG. 7 will be described in detail as follows:

The fuel cell system shown in FIG. 7 comprises a reforming temperature detecting unit 120 for detecting a temperature of a reforming unit 106 which is the main body of the hydrogen generator, a water supply unit 121 comprising a pump for supplying water Y, and a hydrocarbon detecting unit 122 for detecting a concentration of hydrocarbon in the generated gas. As the hydrocarbon detecting unit 122, a gas chromatography type sensor, an infrared radiation absorption type sensor, a photo-acoustic type sensor or the like can be used.

An off-gas G' discharged from out of an fuel electrode 103 in the fuel cell 101 and a generated gas G generated in the reforming unit 106 flow through gas flow paths 123 and 123', respectively, and are then supplied to a burner 109. An air supply unit 110 comprising a fan for supplying air is arranged on the burner 109. A control unit 124 controls the operations of the water supply unit 121 and the air supply unit 110 corresponding to the detected value of the reforming temperature detecting unit 120 or the hydrocarbon detecting unit 122.

Next, the operation and function of the fuel cell system in accordance with the present embodiment will be described. By supplying a raw material X and the water Y to the reforming unit 106, a hydrogen-rich generated gas G is obtained from hydrocarbon in the raw material X due to a steam reforming reaction. The generated gas G and the off-gas G' from the fuel cell flow through the gas flow paths 123 and 123', respectively, and are then supplied to the burner 109. The generated gas G or the off-gas G' supplied to the burner 109 combusts with air supplied from the air supply unit 110 to form a fire 111 in the combustion chamber 108. A combustion gas generated by the fire 111 heats the reforming unit 106 to raise the temperature thereof so that the steam reforming reaction occurs.

Detection of the fire 111 is conducted in such a way that an ion-current flowing with ions in the fire 111 is converted into a voltage which incurs across an electric resistance 115, to be detected with a voltage detecting unit 116. As the amount of hydrocarbon contained in the generated gas G or the off-gas G' supplied to the burner 109 becomes larger, the ion-current in the fire 111 increases, and as the amount of hydrocarbon becomes smaller, the ion-current decreases, making detection of the fire 111 difficult. Since the amount of the remaining hydrocarbon which was not converted into hydrogen in the reforming unit 106 needs to be kept not less than a constant amount, therefore, it is of necessity to control the temperature of the reforming unit 106 to be a predetermined temperature or lower to get a conversion rate of hydrocarbon in the reforming unit 106 to be a predetermined value or lower.

A temperature signal obtained in the reforming temperature detecting unit 120 is sent to a control unit 124 for controlling the temperature of the reforming unit 106. In a case where the temperature of the reforming temperature detecting unit 120 is higher than a predetermined temperature, the amount of air to be supplied from the air supply unit 110 is increased with the control unit 124. The increase in the amount of air from the air supply unit 110 causes supply of air in the amount more than necessary for combustion of the generated gas G or the off-gas G'. Since the extra air cools down the reforming unit 106, the temperature of the reforming unit 106 is lowered in a responsive and prompt manner and the amount of hydrocarbon in the generated gas G or the off-gas G' supplied for the combustion is made not less than the predetermined amount or larger, resulting in stabilization of and increase in the value of the ion-current.

Thereby, a voltage detected in the fire detecting unit 112 can be stable and high, permitting the responsive and responsible detection of ignition and fire extinguishment of the burner 109. Furthermore, immediately after extinguishment of the fire 111, the ion-current stops flowing and a voltage that the fire detecting unit 112 can detect also drops, so that ignition and fire extinguishment can be detected with good responsivity.

When the temperature of the reforming unit 106 is higher than the predetermined temperature, the control unit 124 functions to increase the amount of water to be supplied from the water supply unit 121. With this increase in the amount of water to be supplied from the water supply unit 121, water in an amount more than necessary for the steam reforming reaction is supplied to the reforming unit 106, which lowers the temperature of the reforming unit 106 with a sensible heat or a vapor latent heat of excessive water, and thus lowers the conversion rate of the raw material. This enables the amount of hydrocarbon contained in the generated gas G or the off-gas G' to be a predetermined amount or larger and, therefore, the amount of the ion-current can be increased. Accordingly, ignition and fire extinguishment can be reliably detected by reliably detecting the voltage in the fire detection unit 112.

A concentration of hydrocarbon in the generated gas G is detected with a hydrocarbon detecting unit 122 and the conversion rate of the raw material is calculated by a control unit 124. By controlling at least either the air supply unit 110 or the water supply unit 121 such that the calculated conversion rate is not more than 99%, not less than 1% of hydrocarbon can remain in the generated gas G or the off-gas G'. Supply of the generated gas G or the off-gas G' thus described to the burner 109 results in certain generation of the ions in the fire 111, and reliable detection of the ion-current.

INDUSTRIAL APPLICABILITY

The hydrogen generator in accordance with the present invention as thus described, in a configuration where a generated gas which sent out of the hydrogen generator at the time of the start-up thereof, by grasping changes in the composition of the reformed gas and the flow rate of each constituent thereof, versus time, the flow rate of the combustible gas in the generated gas can be predicted so as to supply an appropriate amount of air, to realize the stable state of combustion and the satisfactory characteristic of the combustion exhaust gas.

Moreover, by measuring the temperatures of the shifting unit and the purifying unit, the flow rate of the combustible gas in the generated gas can be predicted more precisely, with the shifting reaction and the purifying reaction considered and, therefore, the optimal amount of air can be supplied.

Furthermore, also in a case where the fuel is supplied to the burner, by predicting the flow rates of the fuel to be supplied and the flow rate of the combustible gas in the generated gas, a total flow rate of the combustible gas to be supplied to the burner can be grasped, to supply the optimal amount of air, so that the stable state of the combustion and the satisfactory characteristic of the combustion exhaust gas can be realized.

Additionally, by controlling the reforming temperature to be a predetermined temperature or lower, which gets the conversion rate of the raw material in the reforming unit to be a predetermined value or smaller, and the amount of hydrocarbon in the gas to be supplied to the burner to be a predetermined value or larger, the value of then ion-current can be increased. Thereby, the detecting voltage in the fire detecting unit can be increased, to reasonably detect ignition and fire extinguishment. Since the ion-current of the fire is also detected, the flow of the ion-current stops immediately after extinguishment of the fire and the detecting voltage immediately decreases, permitting responsive detection of ignition and fire extinguishment.

The invention claimed is:

1. A hydrogen generator comprising: a reforming unit having a material supply unit and a water supply unit;
    a burner for heating said reforming unit, having a fuel supply unit and an air supply unit,
    a gas flow path for allowing a generated gas to flow from said hydrogen generator to said burner, a reforming temperature detecting unit for measuring a temperature of said reforming unit, and
    a control unit for predicting a flow rate of a combustible gas in said generated gas and for controlling the amount of air to be supplied from said air supply unit to said burner based on a signal indicating an amount of material supplied from said material supply unit and a signal from said reforming temperature detecting unit.

2. The hydrogen generator in accordance with claim 1, wherein said control unit increases the amount of a material to be supplied from said material supply unit at the time of a start-up of said hydrogen generator in a predetermined ratio.

3. The hydrogen generator in accordance with claim 2, further comprising a shifting unit provided downstream from said reforming unit and a shifting temperature detecting unit for measuring a temperature of said shifting unit, wherein said control unit controls the amount of air to be supplied from said air supply unit to said burner based on the signal from said material supply unit, the signal from said reforming temperature detecting unit and a signal from said shifting temperature detecting unit.

4. The hydrogen generator in accordance with claim 3, further comprising a purifying unit provided downstream from said shifting unit and a purifying temperature detecting unit for measuring a temperature of said purifying unit, wherein said control unit controls the amount of air to be supplied from said air supply unit to said burner based on the signal from said material supply unit, the signal from said reforming temperature detecting unit, the signal from said shifting temperature detecting unit and a signal from said purifying temperature detecting unit.

5. The hydrogen generator in accordance with claim 1, wherein said control unit predicts the total flow rate of said combustible gas to be supplied to said burner, based on the predicted flow rate of said combustible gas in said generated gas and the amount of a fuel to be supplied from said fuel supply unit to said burner, and controls the amount of air to be supplied from said air supply unit to said burner.

6. The hydrogen generator in accordance with claim 1, wherein said burner comprises a combustion chamber for forming a fire and a fire detecting unit for detecting a state of said fire based on an ion-current of said fire, and said control unit controls a temperature of said reforming unit to be a predetermined temperature or lower.

7. The hydrogen generator in accordance with claim 6, wherein said control unit controls the temperature of said reforming unit by adjusting the amount of water to be supplied from said water supply unit to said reforming unit.

8. The hydrogen generator in accordance with claim 6, further comprising a hydrocarbon sensor for detecting a concentration of hydrocarbon in said generated gas, wherein said control unit controls the temperature of said reforming unit based on an output value of said hydrocarbon sensor.

9. A fuel cell system comprising a fuel cell and said hydrogen generator recited in any of claims 1 to 8.

* * * * *